United States Patent Office 3,577,551
Patented May 4, 1971

---

3,577,551
METHODS FOR TREATING PAIN, INFLAMMATION AND COUGH
Masuo Murakami and Kaname Kuriaki, Tokyo, Masaru Iwanami, Kanagawa, Hideki Arima, Tokyo, Kenji Sano and Hiroshi Suzuki, Saitama, and Soichi Kagami, Tokyo, Japan, assignors to Yamanouchi Pharmaceutical Co., Ltd., Tokyo, Japan
No Drawing. Filed Apr. 15, 1969, Ser. No. 816,400
Claims priority, application Japan, Apr. 20, 1968, 43/26,514
Int. Cl. A61k *27/00*
U.S. Cl. 424—325                      3 Claims

ABSTRACT OF THE DISCLOSURE

A method of alleviating pain, inflammation and/or cough which comprises administration of a compound selected from the group consisting of compounds of the formula:

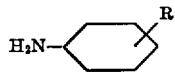

wherein R may be hydrogen or lower alkyl, and their pharmaceutically acceptable acid addition salts.

---

This invention relates to the treatment of pain, inflammation and/or cough.

We have discovered that a cyclohexylamine and certain derivatives thereof are potent analgesics, antiphlogistics and antitussives, useful in alleviating pain, inflammation and cough in warm-blooded animals, including rats, dogs, rabbits, chickens, cows, and humans.

The free base and the non-toxic pharmaceutically acceptable acid addition salts are suitable. The free bases which are used according to this invention have the following general formula:

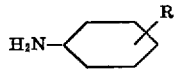

where R may be hydrogen or lower alkyl.

The lower alkyl of R may suitably be in the 2-, 3-, or 4-position.

The term "lower alkyl" means lower-alkyl radicals having preferably from one to six carbon atoms which can be arranged as straight or branched chains and are illustrated by methyl, ethyl, n-propyl, isopropyl, 2-butyl, n-hexyl and the like.

Some examples of the non-toxic pharmaceutically acceptable acid addition salts of the above free bases with inorganic and organic acids are salts with hydrochloric acid, hydrobromic acid, acetic acid, sulfuric acid, phosphoric acid, citric acid, benzoic acid, salicylic acid, acetylsalicylic acid, thioctic acid, orotic acid, glutathione, indomethacin, sulpyrin or quinophan (2-phenyl-quinoline-4-carboxylic acid). These salts can be prepared by methods hereinafter described or well known to the art.

Compounds of this invention may be administered alone but are generally administered with a pharmaceutical carrier orally in the form of tablets or capsules, rectally in the form of suppositories or parenterally in the form of injections.

When a compound of this invention, for example trans-4-methyl-cyclohexylamine, is introduced into an adult human by the oral route, it is preferred to take 10 to 500 mg. of the said compound twice or three times daily. When it is introduced by the subcutaneous route, it is preferred to inject 10 to 300 mg. of the said compound in normal saline solution once daily.

To a cattle, such as a dog and a cat, 0.2 to 10 mg. of the said compound per kg. of body weight may be administered orally twice or three times daily, and 0.2 to 6 mg. of the said compound per kg. of body weight may be administered subcutaneously once daily.

(1) ANALGESIC ACTIVITY

Example 1.—Evaluation by writhing test

Analgesic effect was examined by the method described by P. Koster et al. (Federation Proceeding 18, 412 (1959)).

Drugs dissolved in saline were injected subcutaneously into a group of eight mice each (DD strain, ♂, body weight 14–20 gr.) in volume of 10 ml. per 1 kg. body weight. Into another group of eight mice 10 ml. of saline alone were injected each. Following intraperitoneal injection of 0.6% aqueous acetic acid solution at 10 ml./kg. to the mice of the test group and the control group, number of writhing was counted during the period of twenty minutes after intraperitoneal injection.

The result is shown in Table 1. Inhibition of the writhing in percentage was computed as follows:

$$\frac{\text{(Number of writhing in the test group)} - \text{(Number of writhing in the control group)}}{\text{(Number of writhing in the control group)}} \times 100$$

TABLE 1.—RATE OF INHIBITION OF THE WRITHING IN PERCENTAGE

| Drugs | Dosage (subcutaneously administration), mg./kg. | Rate of inhibition in percent after— | |
|---|---|---|---|
| | | 45 minutes | 90 minutes |
| (1) Cyclohexylamine hydrochloride | 11.0 | 67.5 | 67.8 |
| | 46.7 | 88.0 | 88.8 |
| (2) 2-methylcyclohexylamine hydrochloride (racemic) | 12.1 | 37.9 | 77.0 |
| (3) cis-3-methylcyclohexylamine hydrochloride | 12.1 | 35.7 | 61.4 |
| (4) Trans-4-methylcyclohexylamine hydrochloride | 6.1 | 54.7 | 76.2 |
| | 12.1 | 92.1 | 95.6 |
| (5) Cis-4-methylcyclohexylamine hydrochloride | 6.1 | 6.9 | 1.3 |
| | 12.1 | 71.6 | 73.9 |
| (6) Trans-4-ethylcyclohexylamine hydrochloride | 6.7 | 37.8 | 65.0 |
| | 12.1 | 93.7 | 71.5 |
| (7) Trans-4-propylc cyclohexylamine hydrochloride | 7.2 | 12.0 | 24.0 |
| | 13.2 | 84.3 | 81.0 |
| (8) Salicylic acid | 11.2 | 0 | 7.6 |
| (9) Sulpyrin(1-phenyl-2,3-dimethyl-5-pyrazolone-4-metylamino-methanesulfonate sodium) | 28.3 | 19.2 | 5.8 |
| (10) Aminopyrine(4-dimethylamino-2,3-dimethyl-1-phenyl-3-pyrazoline-5-one) | 26.6 | 26.6 | |
| | 40.0 | 38.4 | |
| | 60.0 | 58.5 | |
| (11) Morphine hydrochloride | 0.30 | 45.0 | |
| | 0.65 | 83.0 | |
| (12) Cyclohexamine(N-ethyl-1-phenyl-cyclohexylamine) | 17.4 | 94.0 | 15.0 |

Drugs 1 to 7 are compounds of this invention, drugs 8 to 12 are known compounds. As shown in the above Table 1, drug 12 (cyclohexamine) is transient. Moreover it has abnormal behaviors.

TABLE 2.—RATE OF INHIBITION OF THE WRITHING IN PERCENTAGE

| Drugs | Dosage oral administration) mg./kg. | Rate of inhibition in percent after— | |
|---|---|---|---|
| | | 45 minutes | 90 minute |
| Cyclohexylamine hydrochloride | 30.0 | 94.7 | 88. |
| Trans-4-methylcyclohexylamine hydrochloride | 15.8 | 54.9 | |
| | 23.7 | 96.0 | |
| Morphine hydrochloride | 2.63 | 21.0 | |
| | 3.94 | 45.1 | |

It should be noted that a number of the compounds of this invention possess analgesic potencies about ¼ of that of morphine even by oral administration.

Example 2.—Evaluation of analgesic activity by pressure method

Analgesic effect was further examined by a physical method of using pressure as stimulus (Takagi et al.: Nihon Yakurigaku Zasshi 78(5), 553 (1958)), modification of a method of A. F. Green et al. (Brit. J. Pharm. 6, 572 (1951)).

The mouse was put in a container with a hole from where its tail can come out. The tail was compressed at its root by means of a glass rod subjected to hydraulic pressure, the pressure value at the moment where the animal shows act of avoidance was read from the mercury manometer. At different time intervals before and after drug administration, the threshold values of pressure were determined, and analgesic potency was expressed in percentage by the following formula:

$$\frac{\text{(test threshold value)} - \text{(control threshold value)}}{\text{(control thresoold value)}} \times 100$$

The result is summarized in Tables 3 and 4.

TABLE 3

| Drugs | Dosage, mg./kg | After subcutaneous injection, minutes | | | | |
|---|---|---|---|---|---|---|
| | | 15 | 30 | 60 | 120 | 240 |
| Control (saline) | | 88.14 | 106.90 | 113.54 | 105.40 | 97.83 |
| Cyclohexylamine hydrochloride | 41.0 | 125.21 | 162.00 | 145.14 | 115.04 | 120.05 |
| Trans-4-methyl-cyclohexylamine hydrochloride | 45.4 | 149.05 | 168.98 | 163.13 | 118.63 | 117.38 |
| Morphine hydrochloride | 5.0 | 167.60 | 189.90 | 159.45 | 110.60 | |
| Aminopyrine(4-dimethylamino-2,3-dimethyl-1-phenyl-3-pyrazoline-5-one) | 150.0 | 199.43 | 161.83 | 158.10 | 138.74 | 137.33 |

TABLE 4

| Drugs | Dosage, mg./kg. | After oral administration, minutes | | | | |
|---|---|---|---|---|---|---|
| | | 30 | 60 | 120 | 240 | 360 |
| Cyclohexylamine hydrochloride | 82.0 | 162.90 | 176.10 | 109.10 | 92.30 | 97.83 |
| Trans-4-methylcyclohexylamine hydrochloride | 90.8 | 235.50 | 155.00 | 121.20 | 110.80 | 95.60 |
| Morphine hydrochloride | 20.0 | 179.30 | 142.70 | 110.60 | 97.70 | 111.10 |
| Aminopyrine | 200.0 | 168.00 | 132.46 | 121.05 | 94.86 | 98.08 |

(2) ANTI-INFLAMMATORY EFFECT

Example 1.—Test on the carrageenin-induced edema

The test was conducted according to the method described by E. A. Risley (Proc. Soc. Exp. Biol. Med. 111, 544 (1962)).

A group of seven rats (wister strain, ♂, body weight 130 to 170 gr.) were fasted for 12 hours prior to the test. Drugs dissolved in saline were administered orally. One hour later 0.05 ml. of 1% carrageenin solution was injected into the plantar tissue of one side of the hind paws; the other side served as control. Three hours after the injection, the test animals were killed and their both feet were amputated at the foot joint weighted, and differences in weight between both hind paws were noted. The control test was carried out similarly except that instead of drug solution a simple saline solution was administered. The antiedematous potency was given in percentage by the following formula:

$$\frac{\text{weight change of the hind paws in the test group}}{\text{weight change of the hind paws in the control group}} \times 100$$

The results are shown in Table 5.

TABLE 5

| Drugs | Dosage, mg./kg. | Potency in percentage |
|---|---|---|
| Cyclohexylamine hydrochloride | 96 | 27.9 |
| | 192 | 40.7 |
| Cyclohexylamine salicylate | 231 | 59.4 |
| Indomethacin salt of cyclohexylamine | 10.2 | 60.0 |
| Trans-4-methylcyclohexylamine hydrochloride | 66 | 27.1 |
| | 100 | 39.0 |
| | 150 | 42.4 |
| Trans-4-ethylcyclohexylamine hydrochloride | 100 | 45.7 |
| cis-4-Methylcyclohexylamine hydrochloride | 100 | 35.6 |
| Oxyphenylbutazone | 66 | 27.1 |
| | 100 | 3.56 |
| | 150 | 45.7 |

(3) ANTITUSSIVE EFFECT

Antitussive effect was examined by a modified method of R. Charlier (Arch. Intern. Pharmacodyn. 134, 306 (1961)).

The sulfur dioxide gas instead of citric acid of the original method was inhaled by mice (Hartley strain, ♂, body weight 400–500 gr.) and the number of cough during 10 minutes was counted. Two hours after, drugs dissolved in a saline were administered subcutaneously in volume of 4 ml. per 1 kg. body weight. Additional 30 minutes later, the $SO_2$ gas was inhaled in the same manner and the number of cough during the period of 10 minutes was counted.

Antitussive potency in percentage was given by $$\frac{\text{(number of cough in the test group)} - \text{(number of cough in the control group)}}{\text{(number of cough in the control group)}} \times 100$$

The results are shown in Table 6.

TABLE 6

| Drugs | Dosage, mg./kg. | Number of animals | Antitussive potency in percentage |
|---|---|---|---|
| Codeine phosphate | 25 | 3 | 57.1 |
| | 50 | 3 | 84.7 |
| Cyclohexylamine hydrochloride | 65 | 2 | 68.3 |
| | 130 | 2 | 70.0 |
| Trans-4-methyl-cyclohexylamine hydrochloride | 25 | 3 | 46.0 |
| | 49 | 3 | 74.3 |

$LD_{50}$ in mouse:

Cyclohexylamine hydrochloride—s.c. 980 mg./kg.; i.p. 190 mg./kg.

trans-4-methylcyclohexylamine hydrochloride—s.c. 220 mg./kg.; i.p. 110 mg./kg.

From the above, it may be concluded that the compounds of this invention have remarkably potent analgesic, antiinflammatory and antitussive activities with comparatively low toxicities.

The following examples are illustrative of the method of preparing the salts and the compositions thereof of this invention.

EXAMPLE 1

Salicylic acid salt of cyclohexylamine

Into a solution of 1.4 g. of salicylic acid in 5 ml. of ethanol was added 1.2 g. of cyclohexylamine. Then the ethanol was distilled off, and the residue was solidified. The residue was crystallized from small amount of ethanol to give 2.1 g. of salicylic acid salt of cyclohexylamine showing the melting point of 106–108° C.

Analysis.—Calculated for $C_{13}H_{19}NO_3$ (percent): N, 5.90. Found (percent): N, 5.97.

EXAMPLE 2

Acetyl salicylic acid salt of cyclohexylamine

Into a solution of 1.8 g. of acetylsalicylic acid in 2 ml. of ethanol was added 1.1 g. of cyclohexylamine. The resultant solution was cooled and the acetyl salicylic acid salt of cyclohexylamine was crystallized, which recrystallized from ethanol to give 1.8 g. of the product showing the melting point of 105–106° C.

Analysis.—Calculated for $C_{15}H_{21}NO_4$ (percent): N, 5.01. Found (percent): N, 5.14.

EXAMPLE 3

Glutathione salt of cyclohexylamine

Into a solution of 500 mg. of glutathione in a mixture of 1 ml. of methanol and 1 ml. of water, was added 162 mg. of cyclohexylamine. Then the solvent was distilled off, and the glutathione salt of cyclohexylamine was crystallized, which is recrystallized from ethanol to give the product showing the melting point of 207–209° C.

Analysis.—Calculated for $C_{16}H_{17}N_3O_6S$ (percent): N, 13.7. Found (percent): N, 13.4.

EXAMPLE 4

Indomethacin salt of cyclohexylamine

The product, showing the melting point of 162–164° C., was obtained, by treating Indomethacin [1-(P-chlorobenzoyl)-2-methyl-5-methoxy indole-3-acetic acid] and cyclohexylamine, in a similar method as in Example 2.

Analysis.—Calculated for $C_{25}H_{29}N_2O_4Cl$ (percent): N, 6.13. Found (percent): N, 6.03.

EXAMPLE 5

Isobutyl phenyl acetic acid salt of cyclohexylamine

The product, showing the melting point 160–162° C., was obtained, by treating isobutyl phenyl acetic acid and cyclohexylamine, in a similar method as in Example 5.

Analysis.—Calculated for $C_{18}H_{29}NO_2$ (percent): N, 4.81. Found (percent): N, 4.80.

EXAMPLE 6

2,3-dimethyl-1-phenyl-5-pyrazolone-4-methyl amino methane sulfonic acid salt of cyclohexylamine Into 28 ml. of 1 N-hydrochloric acid, 1.0 g. of 2,3-dimethyl-1-phenyl-5-pyrazolone-4-methyl amino methane sulfonic acid was dissolved, and into the solution 0.28 g. of cyclohexylamine was added. The resultant solution was concentrated under reduced pressure, and the residue was extracted with ethanol after sodium chloride was removed. The extract was concentrated under reduced pressure. The thus-obtained crystal was recrystallized from ethanol to give 1.0 g. of the product as white crystal.

Analysis.—Calculated for $C_{19}H_{30}N_4O_4S$ (percent): N, 13.65. Found (percent): N, 13.41.

EXAMPLE 7

2-phenylquinoline-4-carboxylic acid salt of cyclohexylamine

Into a solution of 1.2 g. of 2-phenylquinoline-4-carboxylic acid in 10 ml. of ethanol, 0.5 g. of cyclohexylamine was added. The ethanol was distilled off. The resultant syrup was treated with ether to give a solid. The solid was recrystallized from ethanol-ether, to give 1.5 g. of the product as white crystal showing the melting point of 153–155° C.

Analysis.—Calculated for $C_{22}H_{24}N_2O_2$ (percent): N, 8.09. Found (percent): N, 7.90.

EXAMPLE 8

Thioctic acid salt of cyclohexylamine

One gram of thiotic acid was dissolved in n-hexane, and 0.6 g. of cyclohexylamine was added. After a while, the thioctic acid salt of cyclohexylamine began to crystallize, and was recovered by filtration to give 1.2 g. of the product showing the melting point of 125–127° C.

Analysis.—Calculated for $C_{14}H_{27}NO_2S_2$ (percent): N, 4.59. Found (percent): N, 4.67.

EXAMPLE 9

Orotic acid salt of cyclohexylamine

Into a suspension of 1.5 g. of orotic acid in 30 ml. of water, was added 1.2 g. of cyclohexylamine. The reaction mixture was cooled, to obtain 1.9 g. of white crystal of orotic acid salt of cyclohexylamine showing the melting point 292–293° C.

Analysis.—Calculated for $C_{11}H_{17}N_3O_4$ (percent): N, 16.46. Found (percent): N, 16.60.

EXAMPLE 10

Sulfa dimethoxine salt of cyclohexylamine

Into a suspension of 1.5 g. of sulfadimethoxine [N'-(2.6-dimethoxy-4-pyrimidinyl)sulfanilamide], in 50 ml. of water was added 0.5 g. of cyclohexylamine. The reaction mixture was cooled to obtain 2.0 g. of white crystal of the product showing the melting point 172° C.

Analysis.—Calculated for $C_{18}H_{27}N_5O_4S$ (percent): N, 17.10. Found (percent): N, 17.26.

EXAMPLE 11

Sulfisoxazole salt of cyclohexylamine

Into a suspension of 1.3 g. of sulfisoxazol [N'-3',4'-dimethyl-isoxazolyl)sulfanilamide] in 5 ml. of water was added 0.5 g. of cyclohexylamine. The reaction mixture was cooled, and 0.9 g. of white crystal of the product showing the melting point 185° C. was obtained.

Analysis.—Calculated for $C_{17}H_{26}N_4O_3S$ (percent): N, 15.29. Found (percent): N, 15.41.

EXAMPLE 12

Injection

Hydrochloric acid salt of cyclohexylamine was dissolved into saline. The solution was adjusted to pH 6 and sterilized to give injectable solution containing 20 mg. of active ingredient per 1 ml.

EXAMPLE 13

Capsule formation

| | G. |
|---|---|
| Hydrochloric acid of trans-4-methyl cyclohexylamine | 2 |
| Lactose | 28 |

Blend all of the ingredients until uniformly mixed. Fill into 100 capsules. Each capsule contains 20 mg. of active ingredient, trans-4-methyl cyclohexylamine.

EXAMPLE 14

Tablet formulation

| | G. |
|---|---|
| Hydrochloric acid salt of cyclohexylamine | 1 |
| Lactose | 20 |
| Gum arabic | 1 |
| Talc | 4 |
| Stearic acid powder | 5 |

Blend all ingredients with sufficient amount of ethanol until uniformly mixed, granulate and compress in a conventional manner to give 100 tablets. Each tablet contains 10 mg. of active ingredient, hydrochloric acid salt of cyclohexylamine.

We claim:

1. The method of alleviating pain, inflammation and/or cough in a warm-blooded animal suffering from pain, inflammation and/or cough which comprises administering to said animal an effective amount of a compound selected from the group consisting of

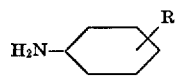

where R is hydrogen or lower alkyl; and a pharmaceutically acceptable acid addition salt thereof.

2. The method according to claim 1 which comprises administering to said animal an effective amount of cyclohexylamine hydrochloride.

3. The method according to claim 1 which comprises administering to said animal an effective amount of trans-4-methylcyclohexylamine hydrochloride.

References Cited
UNITED STATES PATENTS 2,692,282   10/1954   Brown _____ 260—557
2,742,397   4/1956    Ott _____ 424—325

STANLEY J. FRIEDMAN, Primary Examiner